United States Patent
Yin et al.

(10) Patent No.: US 10,006,311 B2
(45) Date of Patent: Jun. 26, 2018

(54) WASTE HEAT RECOVERY SYSTEM AND METHOD OF OPERATING THE SAME

(71) Applicant: MODINE MANUFACTURING COMPANY, Racine, WI (US)

(72) Inventors: JianMin Yin, Menomonee Falls, WI (US); Eric P. Steinbach, Wausau, WI (US)

(73) Assignee: Modine Manufacturing Company, Racine, WI (US)

( * ) Notice: Subject to any disclaimer, the term of this patent is extended or adjusted under 35 U.S.C. 154(b) by 99 days.

(21) Appl. No.: 15/008,746

(22) Filed: Jan. 28, 2016

(65) Prior Publication Data

US 2016/0138427 A1    May 19, 2016

Related U.S. Application Data

(63) Continuation of application No. 13/811,444, filed as application No. PCT/US2011/049381 on Aug. 26, 2011, now Pat. No. 9,267,414.
(Continued)

(51) Int. Cl.
*F01K 23/10* (2006.01)
*F02G 3/00* (2006.01)
(Continued)

(52) U.S. Cl.
CPC .............. *F01K 3/004* (2013.01); *F01K 25/10* (2013.01); *F01K 27/00* (2013.01); *F01N 5/02* (2013.01);
(Continued)

(58) Field of Classification Search
CPC .......... F01K 3/004; F01K 25/10; F01K 27/00; F02M 26/24; F02M 26/28; F02M 26/33;
(Continued)

(56) References Cited

U.S. PATENT DOCUMENTS

| 7,380,544 | B2 * | 6/2008 | Raduenz | F02M 26/32 |
| | | | | 123/568.12 |
| 7,866,305 | B2 * | 1/2011 | Geskes | F02M 26/29 |
| | | | | 123/568.12 |

(Continued)

FOREIGN PATENT DOCUMENTS

| JP | 2007239513 A | * | 9/2007 |
| JP | 2007255278 A | * | 10/2007 |
| JP | 2012102619 A | * | 5/2012 |

*Primary Examiner* — Thai Ba Trieu
(74) *Attorney, Agent, or Firm* — Michael Best & Friedrich LLP (57) ABSTRACT

A method of recovering waste heat includes pressurizing a flow of working fluid and transferring heat from a hot gas stream to the flow of working fluid in at least two successively arranged heat transfer sections. At least some of the working fluid is converted to a superheated vapor by the transfer of heat, and passes through an expander to recover useful work. A portion of the flow of working fluid is directed along a branch after having passed through at least one of the heat transfer sections, and bypasses the expander and at least one of the heat transfer sections before being recombined with the working fluid that has passed through the expander. The total flow rate of working fluid can be adjusted to regulate the temperature of the hot gas stream downstream of the heat transfer sections, and the amount of fluid that bypasses along the branch can be adjusted to regulate the temperature of the superheated vapor.

16 Claims, 6 Drawing Sheets

Related U.S. Application Data (60) Provisional application No. 61/377,333, filed on Aug. 26, 2010.

(51) Int. Cl.

| | | |
|---|---|---|
| *F01K 27/00* | (2006.01) | |
| *F01K 23/06* | (2006.01) | |
| *F02M 25/07* | (2006.01) | |
| *F28D 7/00* | (2006.01) | |
| *F28F 9/22* | (2006.01) | |
| *F28F 3/08* | (2006.01) | |
| *F28F 21/00* | (2006.01) | |
| *F01K 3/00* | (2006.01) | |
| *F02M 26/28* | (2016.01) | |
| *F02M 26/32* | (2016.01) | |
| *F02M 26/33* | (2016.01) | |
| *F02M 26/24* | (2016.01) | |
| *F01K 25/10* | (2006.01) | |
| *F01N 5/02* | (2006.01) | |
| *F22G 5/00* | (2006.01) | |
| *F22G 5/20* | (2006.01) | |
| *F28D 9/00* | (2006.01) | |
| *F28D 21/00* | (2006.01) | |
| *F28F 3/02* | (2006.01) | |

(52) U.S. Cl.
CPC ............ *F02M 26/24* (2016.02); *F02M 26/28* (2016.02); *F02M 26/32* (2016.02); *F02M 26/33* (2016.02); *F22G 5/00* (2013.01); *F22G 5/20* (2013.01); *F28D 9/0043* (2013.01); *F28D 9/0093* (2013.01); *F28D 21/001* (2013.01); *F28F 3/025* (2013.01); *F28F 2215/04* (2013.01); *Y02T 10/121* (2013.01); *Y02T 10/16* (2013.01); *Y02T 10/166* (2013.01)

(58) Field of Classification Search
CPC ..... F01N 5/02; F02G 5/00; F02G 5/20; F28D 9/0043; F28D 9/0093; F28D 21/001; F28F 3/025; Y02T 10/121; Y02T 10/16; Y02T 10/166
USPC .............. 60/616, 618, 670, 671, 597, 605.2; 123/562.11–568.12; 165/104, 26, 164, 165/166, 167, 69, 177; 62/305
See application file for complete search history.

(56) References Cited

U.S. PATENT DOCUMENTS

| | | | | |
|---|---|---|---|---|
| 7,975,479 | B2 * | 7/2011 | Altin | F28F 21/06 60/605.2 |
| 8,061,334 | B2 * | 11/2011 | Eitel | F02M 26/06 60/605.2 |
| 2008/0264622 | A1 * | 10/2008 | Altin | F28F 9/26 165/180 |
| 2009/0145126 | A1 * | 6/2009 | Chillar | F01D 25/30 60/605.2 |
| 2009/0260775 | A1 * | 10/2009 | Maucher | F28D 9/0043 165/41 |
| 2010/0282452 | A1 * | 11/2010 | Diem | F01K 23/065 165/167 |
| 2010/0293943 | A1 * | 11/2010 | Teng | F02M 26/24 123/568.12 |
| 2011/0048002 | A1 * | 3/2011 | Taylor | F01K 23/10 60/605.2 |
| 2011/0088671 | A1 * | 4/2011 | Johnson | F01K 23/065 123/568.12 |
| 2011/0094486 | A1 * | 4/2011 | Vuk | F02M 26/34 60/605.2 |
| 2011/0209473 | A1 * | 9/2011 | Fritz | F01K 23/065 60/618 |
| 2011/0239643 | A1 * | 10/2011 | LeJeune | F01K 23/065 60/598 |
| 2012/0192560 | A1 * | 8/2012 | Ernst | F01K 23/065 60/616 |
| 2012/0198839 | A1 * | 8/2012 | Nelson | F01K 23/065 60/605.1 |
| 2012/0199327 | A1 * | 8/2012 | Gaiser | F28F 1/32 165/160 |
| 2012/0222420 | A1 * | 9/2012 | Geskes | F01K 23/065 60/618 |
| 2012/0285169 | A1 * | 11/2012 | Freund | F02G 5/00 60/643 |
| 2013/0019847 | A1 * | 1/2013 | Nelson | F02G 5/00 123/568.12 |
| 2013/0075245 | A1 * | 3/2013 | Frick | B01D 1/0047 203/22 |
| 2013/0199178 | A1 * | 8/2013 | Kanou | F01K 23/065 60/605.2 |
| 2014/0026577 | A1 * | 1/2014 | Reinke | F01K 13/006 60/670 |
| 2015/0275698 | A1 * | 10/2015 | Kawai | F01K 23/065 60/604 |
| 2015/0275701 | A1 * | 10/2015 | Hughes | F28F 3/027 60/670 |
| 2016/0222833 | A1 * | 8/2016 | Fraser | F01K 23/065 |
| 2017/0089222 | A1 * | 3/2017 | Wright, Jr. | F01K 23/065 |

* cited by examiner

WASTE HEAT RECOVERY SYSTEM AND METHOD OF OPERATING THE SAME

CROSS-REFERENCE TO RELATED APPLICATIONS

The present application is a continuation of, and claims priority to, U.S. patent application Ser. No. 13/811,444, filed on Jan. 22, 2013, which is a national phase entry under 35 U.S.C. § 371 of International Application No. PCT/US2011/049381, filed on Aug. 26, 2011, which claims priority to U.S. Provisional Patent Application No. 61/377,333, filed on Aug. 26, 2010, all of the contents of which are incorporated herein by reference.

BACKGROUND

Increasing the operating efficiency of heat engines and other power producing cycles has become more advantageous as the cost of fuels has steadily increased. Additionally, the desire by both individuals and governmental bodies to reduce pollutants and other undesirable byproducts of fuel consumption has led to further interest in such increases. One recognized means by which such increases may be realized is waste heat recovery.

In a typical waste heat recovery system, thermal energy that is produced as a byproduct of a fuel-consuming process and that would otherwise be wasted (e.g. discharged to the ambient as a waste stream) is captured and converted to useful work. One well-known thermodynamic cycle used in waste heat recovery is the Rankine cycle, wherein a working fluid is pressurized as a liquid, vaporized by receiving the waste heat, non-adiabatically expanded to recover mechanical work, and condensed and cooled to complete the cycle.

While it may be highly desirable to maximize the conversion efficiency of such a waste heat recovery cycle, certain other considerations necessarily must be taken into account. Many of the working fluids that perform favorably in Rankine cycle waste heat recovery systems are sensitive to breakdown of the fluid at elevated temperatures, necessitating regulation of the peak temperature to which such a fluid is heated. In addition, certain additives to the fluid such as, for example, lubricants for the expander, may have an upper temperature rating.

As a further complication, it may be necessary in some systems to control or regulate the temperature to which the waste stream is cooled. As one example, catalytic aftertreatment of the waste stream may necessitate that the stream is within a certain temperature range, in order that the activity of the catalyst may be suitable for the desired reactions.

Another example of the need to regulate the temperature of the waste stream can be found in exhaust gas recirculation (EGR) systems for internal combustion engines. In such a system, a high temperature exhaust gas stream is recycled from the exhaust manifold of an internal combustion engine back to the intake manifold of the engine. An EGR system may be used on a diesel or gasoline fueled compression ignition or spark ignition engine of a vehicle such as an automobile or truck, in order to reduce undesirable NOx emissions from the engine. In order to be successful at reducing those emissions, however, the recycled exhaust gas stream must be cooled to a much lower temperature than that at which it exits the exhaust manifold of the engine. Accordingly, waste heat must be rejected from the exhaust, and recovery of that waste heat through a Rankine cycle may advantageously be used to improve the efficiency of the vehicle.

The need to regulate the temperature of the vaporized working fluid and the need to regulate the temperature of the waste heat stream may oftentimes be at odds with one another, causing difficulties for system designers and operators. Accordingly, there is still room for improvement in waste heat recovery systems.

SUMMARY

Some embodiments of the invention provide a waste heat recovery system to generate power from thermal energy contained in a hot gas stream. The waste heat recovery system comprises a hot gas stream flow path extending from a hot gas stream source and along which the hot gas stream flows, a pump, and an expander. The system further comprises: a first working fluid flow path fluidly connecting an outlet of the pump and an inlet of the expander; a second working fluid flow path fluidly connecting an outlet of the expander and an inlet of the pump; first and second heat exchange sections located along both the first working fluid flow path and the hot gas stream flow path to transfer heat from the hot gas stream to working fluid traveling along the first working fluid flow path, the second heat exchange section being located along the first working fluid flow path between the pump and the first heat exchange section; and a third working fluid flow path fluidly connecting a first branch point along the first working fluid path to a second branch point along the second working fluid path to enable at least a portion of the working fluid to bypass the first heat exchange section and the expander.

In some embodiments of the invention the first heat exchange section and the second heat exchange section are part of a single heat exchanger.

In some embodiments the waste heat recovery system may comprise a flow control device located along the third working fluid flow path, and may further comprise a temperature sensor located along the first working fluid flow path between the first heat exchange section and the expander. The flow control device may be responsive to a temperature measured by the temperature sensor.

In some embodiments the waste heat recovery system may comprise a temperature sensor located along the hot gas stream flow path downstream of the first and second heat exchange sections, and the flow rate of the pump may be adjusted in response to a temperature measured by the temperature sensor.

In some embodiments the second working flow path includes a heat rejection section in which heat is rejected from the working fluid. In some such embodiments the heat rejection section includes a condenser and a liquid sub-cooler located downstream of the condenser. In some embodiments at least a portion of the heat rejection section is located downstream of the second branch point.

Some embodiments of the invention provide a method of recovering waste heat. The method includes: pressurizing a flow of liquid working fluid from a first pressure to a second pressure higher than the first pressure; transferring a first quantity of heat from a hot gas stream into the flow of liquid working fluid; splitting the flow of liquid working fluid into a first portion and a second portion; transferring a second quantity of heat from the hot gas stream into the first portion to convert the first portion to a superheated vapor; non-adiabatically expanding the superheated first portion; and recombining the second portion with the expanded first portion.

In some embodiments the method additionally includes measuring the temperature of the hot gas stream, and adjusting the flow rate of the flow of liquid working fluid in response to the measured hot gas stream temperature. In some embodiments the temperature of the hot gas stream is measured after the first and second quantities of heat have been transferred therefrom.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
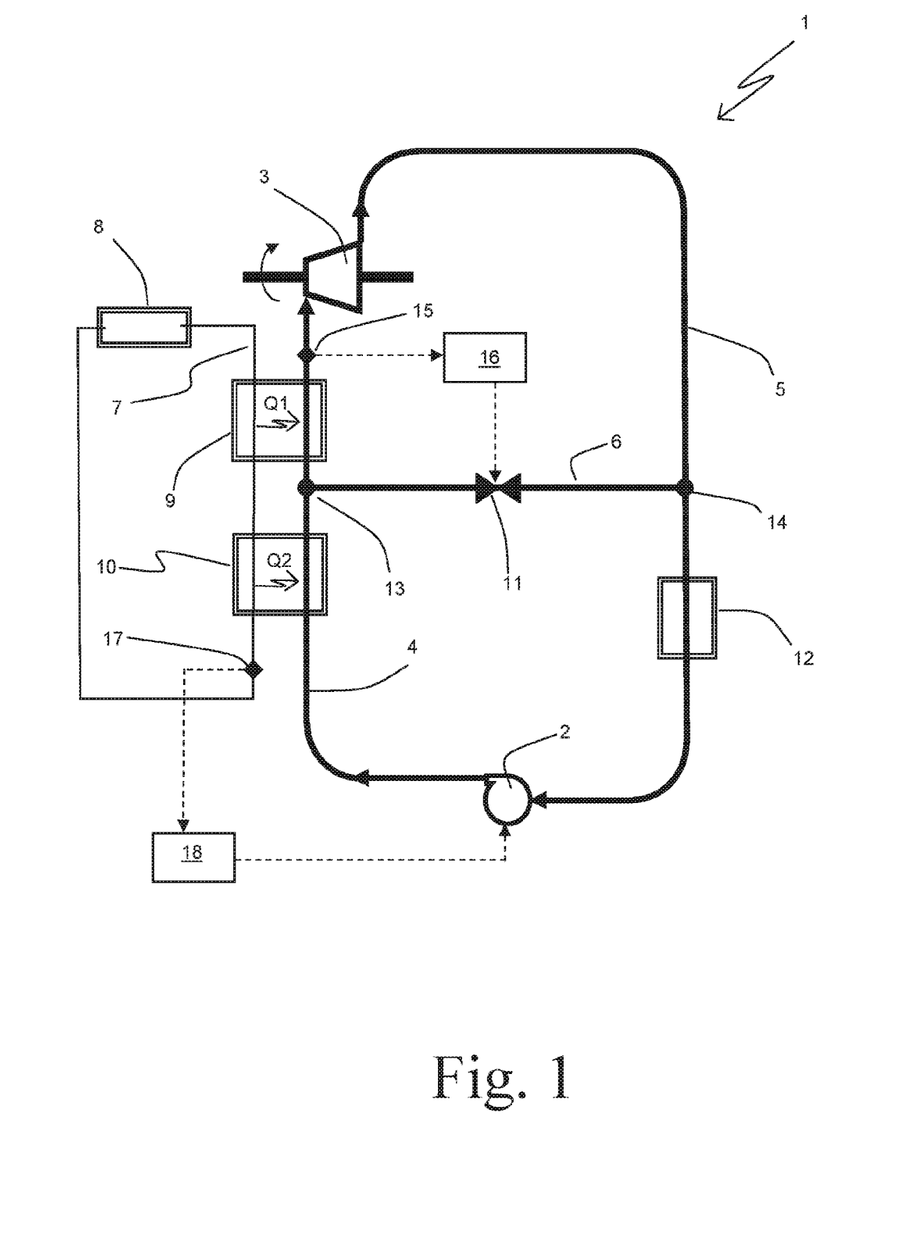
FIG. 1 is a schematic of a waste heat recovery system according to an embodiment of the invention.

Relevant portions of a waste heat recovery system 1 according to an embodiment of the invention are depicted in FIG. 1. The waste heat recovery system 1 comprises a pump 2 to pressurize and direct a flow of working fluid through the system 1, as well as an expander 3 to expand a flow of working fluid from a relatively high pressure vapor state to a relatively low pressure vapor state in order to recover useful work from energy contained within the flow of working fluid at the relatively high pressure vapor state.

The working fluid can comprise any type of fluid that may be used in such cycles. By way of example only, the working fluid may comprise: water; ammonia; alcohols, including but not limited to ethanol and methanol; refrigerants, including but not limited to R134a, R152a, and R22; hydrocarbons, including but not limited to propane and butane; organic working fluids, including but not limited to R245fa; and combinations thereof.

It should be understood that the pump 2 can be any type of machinery typically used to pressurize and provide motive flow to a liquid, including but not limited to positive displacement pumps, reciprocating action pumps, rotary action pumps, kinetic pumps and centrifugal pumps, among others. Similarly the expander 3 can be any type of machinery capable of converting pressure energy into mechanical work, including but not limited to piston expanders, impulse turbines and reaction turbines, among others.

A first working fluid flow path 4 fluidly connects an outlet of the pump 2 to an inlet of the expander 3 in order to convey a working fluid from the pump outlet to the expander inlet. A second working fluid flow path 5 fluidly connects an outlet of the expander 3 to an inlet of the pump 2 so that working fluid delivered to the expander 3 can be returned to the pump 2 in order to complete the flow circuit.

The waste heat recovery system 1 further comprises a hot gas stream flow path 7 and a hot gas stream source 8, with the hot gas stream flow path 7 connected to the hot gas stream source 8 in order to receive a hot gas stream therefrom.

Additionally, the waste heat recovery system 1 includes a first heat exchange section 9 and a second heat exchange section 10, both of which are located along the hot gas stream flow path 7 and the first working fluid flow path 4. The first heat exchange section 9 is located downstream of the second heat exchange section 10 along the first working fluid flow path 4, so that the second heat exchange section 10 is located between the pump 2 and the first heat exchange section 9 along the first working fluid flow path 4.

Although the exemplary embodiment of FIG. 1 shows the heat exchange sections 9, 10 as being arranged along the hot gas stream flow path 7 such that the second heat exchange section 10 is downstream of the first heat exchange section 9 (in other words, the first heat exchange section 9 is at a location along the hot gas stream flow path 7 between the hot gas stream source and the second heat exchange section 10), it should be recognized that alternative arrangements may be equally suitable or even preferable in certain applications. For example, in some applications it may be preferable to reverse the order of the heat exchange sections 9, 10 along the hot gas stream flow path 7 so that the first heat exchange section 9 is located downstream of the second heat exchange section 10.

A third working fluid flow path 6 connects a first branch point 13 located along the first working fluid flow path 4 and a second branch point 14 located along the second working fluid flow path 5, thus effectively creating a pathway by which a portion of working fluid exiting the pump 2 can bypass the expander 3. The first branch point 13 is located between the first heat exchange section 9 and the second heat exchange section 10.

A flow control device 11 may be located along the third working fluid flow path 6, as is shown in the exemplary embodiment of FIG. 1. The flow control device 11 may be a variable type device, such as a valve for example, or it may be a non-variable device such as a fixed orifice. The flow control device 11 can regulate the rate of working fluid flow along the third working fluid flow path 6 in order to balance the split between the working fluid flowing along the third working fluid flow path 6 and the working fluid delivered to the expander 3.

Since the first branch point 13 is on the high pressure side of the expander 3 and the second branch point 14 is on the low pressure side of the expander 3, a reduction in pressure of the working fluid must occur along the third working fluid flow path 6. This pressure reduction may be advantageously achieved in the flow control device 11. For example, the working fluid may be adiabatically expanded in the flow control device 11 by throttling the flow therethrough.

A heat rejection section 12 is included along the second working fluid flowpath 5 in the waste heat recovery system 1 according to the exemplary embodiment of FIG. 1. Within the heat rejection section 12 some quantity of thermal energy (heat) that was transferred to the working fluid along the first flow path 4, but was not converted to useful work in the expander 3, can be rejected from the working fluid. This rejection of heat may be necessary in order to return the working fluid to a subcooled liquid state suitable for delivery to the pump 2.

The heat rejection section 12 may take any form that is useful for removing waste heat from a fluid stream. By way of example, the heat rejection section 12 may include an air-cooled condenser of the type commonly used to cool and condense a refrigerant vapor in a vapor compression air conditioning system, or it may include a liquid-cooled condenser as is commonly known in the art. As still another example, the heat rejection section 12 could be a reservoir of working fluid that is of sufficient size and thermal capacity to allow for the rejection of the necessary heat through the walls of the reservoir.

In some embodiments the heat rejection section 12 may comprise multiple heat exchanging components. For example, the heat rejection section 12 may comprise a first heat exchanger to operate as a condenser, and a second heat exchanger to operate as a liquid sub-cooler, the liquid sub-cooler being located downstream of the condenser so as to receive the working fluid therefrom in a liquid state in order to further cool the liquid working fluid.

Although the heat rejection section 12 as shown in FIG. 1 is depicted as being located at a position along the second working fluid flowpath 5 that is downstream of the second branch point 14, alternative locations may be equally suitable or even more suitable for certain waste heat recovery systems. Two such alternative arrangements are illustrated in FIGS. 2A and 2B.

Figure 2A:
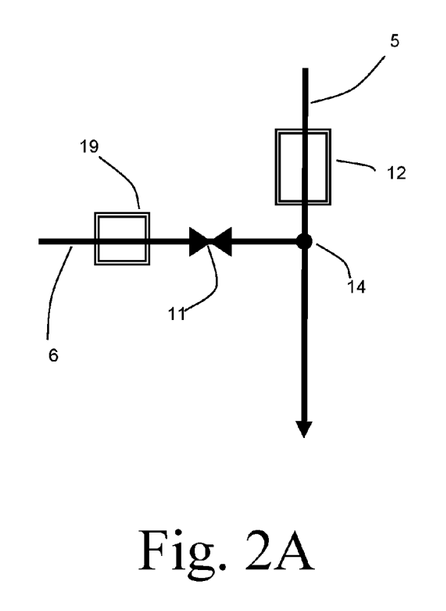
FIGS. 2A and 2B are two alternative versions of a portion of the schematic of FIG. 1.

In the arrangement of FIG. 2A, the heat rejection section 12 has been located so as to be upstream of the second branch point 14 along the second working fluid flowpath 5. As a result, the working fluid traveling along the third working fluid flowpath 6 would not pass through the heat rejection section 12 of the embodiment shown in FIG. 2A. Instead, heat can be separately rejected from the working fluid traveling along the third working fluid flowpath 6 in a second heat rejection section 19 located along the third working fluid flowpath 6. The second heat rejection section 19 may be advantageously arranged upstream of the flow control device 11, where the working fluid is a high-pressure liquid.

Figure 2B:
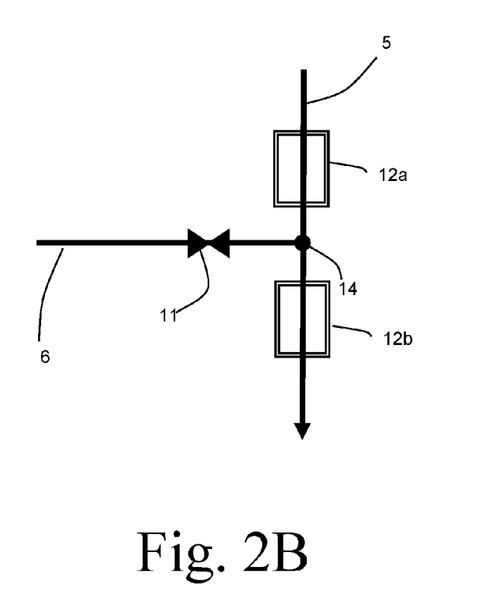

In the arrangement of FIG. 2B, the heat rejection section 12 has been separated into a first portion 12a located upstream of the second branch point 14 along the second working fluid flowpath 5, and a second portion 12b located downstream of the second branch point 14 along the second working fluid flowpath 5. In some embodiments the first portion 12a may be a condenser to convert the vapor state working fluid exiting the expander 3 to a liquid state. In some embodiments the second portion 12b may be a liquid sub-cooler to further cool working fluid received from the first portion 12a and from the third working fluid flow path 6. In some embodiments it may be preferable to combine the heat rejection section 19 as shown in FIG. 2A into the embodiment of FIG. 2B in order to pre-cool the working fluid along the third working fluid flowpath 6.

Certain advantages (e.g. system compactness and a reduced number of interconnections, among others) may be achieved when the first heat exchange section 9 and the second heat exchange section 10 are part of a single heat exchanger. By way of example, heat exchanger 20 depicted in FIG. 3 comprises the first heat exchange section 9 and the second heat exchange section 10 in a single unitary structure. The exemplary heat exchanger 20 is of a bar-plate construction, although other styles of heat exchanger construction may be similarly suitable.

Figure 4:
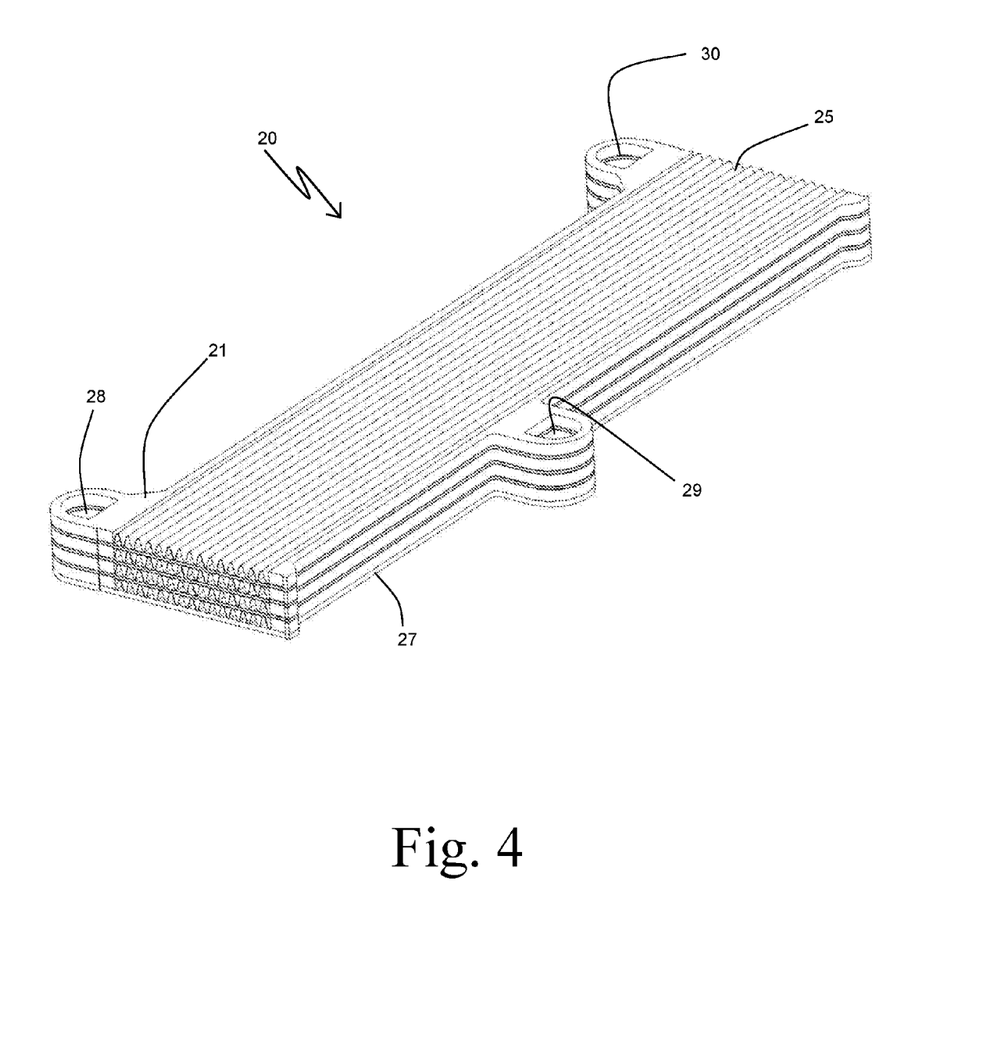
FIG. 4 is a perspective view of the heat exchanger of FIG. 3 in a partially assembled state.
Figure 5:
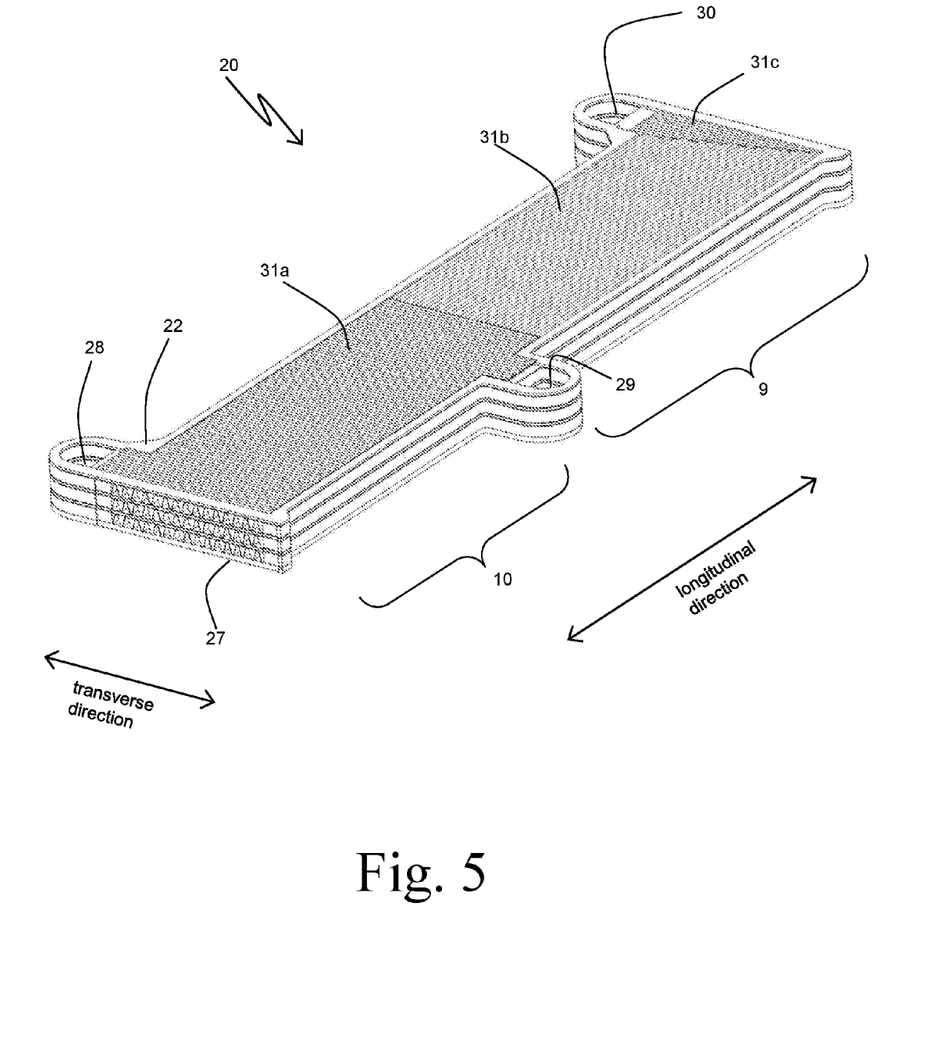
FIG. 5 is a perspective view of the heat exchanger of FIG. 3 in another partially assembled state.

As shown in additional detail in FIGS. 4 and 5, the heat exchanger 20 includes a plurality of hot gas flow layers 21 interleaved with a plurality of working fluid flow layers 22 and arranged between a top plate 26 and a bottom plate 27. The hot gas flow layers 21 are connected to the hot gas flow path 7 by way of a hot gas inlet fitting 24 and a hot gas outlet fitting 23, so that hot gas 32 flowing along the hot gas flow path 7 can travel through the heat exchanger 20 along the hot gas flow layers 21. As best seen in FIG. 4, the hot gas flow layers 21 include a convoluted fin structure 25 to provide extended surface area for an increased rate of heat transfer.

The working fluid flow layers 22 are connected to the first working fluid flow path 4 by way of a first manifold 28 located at a first end of the working fluid flow layers 22 and by way of a second manifold 30 located at a second end opposite of the first end. Furthermore, the working fluid flow layers 22 are connected to the third working fluid flow path 6 by way of a third manifold 29 located partway between the first and second ends. The third manifold 29 can comprise the first branch point 13 of the waste heat recovery system 1. It should be understood that the connections between the heat exchanger 20 and the working fluid flow paths 4 and 6 are shown as being made through the top plate 26 for ease of illustration only, and that one or more of the connections may alternatively be made through the bottom plate 27.

Figure 3:
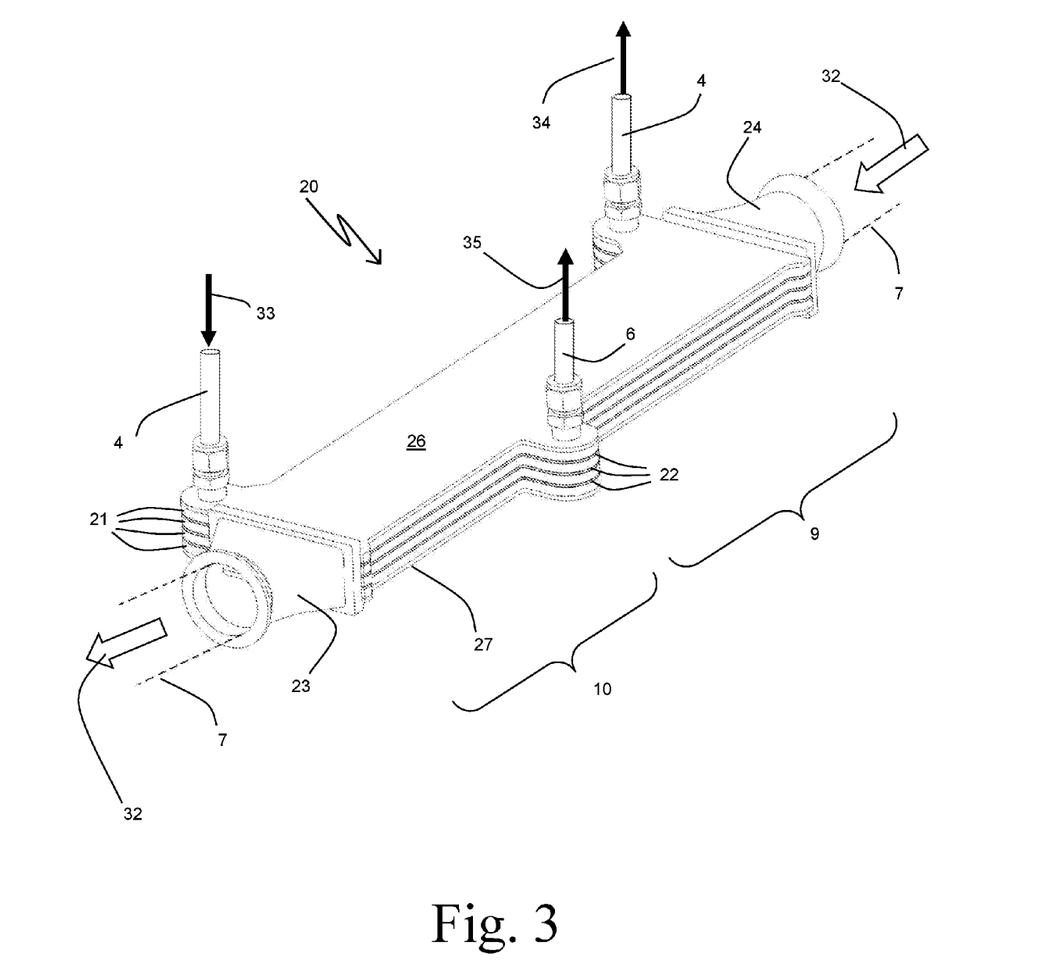
FIG. 3 is a perspective view of a heat exchanger for use in some embodiments of the invention.

As further shown in FIG. 3, the heat exchanger 20 receives a flow of working fluid (represented by the arrow 33) into the manifold 28 and distributes that flow of working fluid among the working fluid flow layers 22. A portion of the flow (represented by the arrow 35) travels only partway through the heat exchanger 20 before exiting along the third fluid flow path 6 via the manifold 29. The balance of the flow (represented by the arrow 34) continues along the remaining length of the fluid flow layers 22 and exits from the heat exchanger 20 by way of the manifold 30. In this manner, the entire flow 33 travels through the heat exchanger section 10 whereas only the portion 34 travels through the heat exchanger section 9.

Turbulator plates 31 are located along the working fluid flow layers 22 in order to direct and turbulate the working fluid and to provide extended surface area for enhanced heat transfer performance. As seen in FIG. 5, the turbulator plates 31 may comprise multiple sections 31a, 31b, 31c, etc. It should be understood that, although three distinct turbulator sections 31 are illustrated in the exemplary embodiment, other embodiments may have a greater or lesser number of such sections.

In the exemplary heat exchanger 20, the first turbulator plate section 31a extends from the manifold 28 to a location part-way between manifold 29 and manifold 30. Preferably the turbulator plate section 31a is of a type that allows for fluid flow in both the longitudinal direction and in the transverse direction. For example, the turbulator plate section 31a may comprise a lanced and offset turbulator plate.

In certain embodiments it may be especially preferable for the flow resistance in the transverse direction of the turbulator plate section 31a to be substantially lower than the flow resistance in the longitudinal direction of the turbulator plate section 31*a*, as can be achieved with a lanced and offset turbulator plate. This allows for more uniform distribution of the high-density liquid working fluid at the inlet section of the heat exchanger 20.

The second turbulator plate section 31*b* is located downstream of the turbulator plate section 31*a*. In this region the working fluid is converted from a single-phase liquid to a superheated vapor. Due to the resulting decrease in density it may be especially beneficial for the turbulator plate 31*b* to be less restrictive to flow along the longitudinal direction. For example, the turbulator plate 31*b* may be of the lanced and offset type, with low flow resistance direction aligning with the longitudinal direction of the heat exchanger. In some embodiments the same or similar result may be achieved with plain serpentine convolutions such that the turbulator plate 31*b* essentially does not allow for flow in the transverse direction.

The third turbulator plate section 31*c* is located downstream of the turbulator plate section 31*b* to transfer the portion 34 of the flow to the manifold 30. Preferably the section 31*c* has a relatively low flow resistance in the transverse direction, since the fluid traveling through it is typically a low density superheated vapor. In some embodiments it may be especially preferable for the transition from the turbulator plate section 31*b* to the turbulator plate section 31*c* to occur along one or more lines that are arranged at a non-perpendicular angle to both the longitudinal direction and the transverse direction, as shown in the exemplary embodiment. In this manner the fluid in each of the longitudinally oriented channels of the turbulator plate section 31*b* can be directed into transversely oriented channels of the turbulator plate section 31*c* with minimal pressure drop.

In some embodiments it may be advantageous to use the third working fluid flow path 6 in order to bypass all of the working fluid around the expander 3 under certain operating conditions. For example, it may be preferable to have working fluid circulating through the system at a time when hot gas is not available from the hot gas stream source 8, such as may be the case at system start-up. In order to avoid the delivery of liquid phase working fluid to the expander 3, the flow control device 11 may be made to be fully open.

Figure 6:
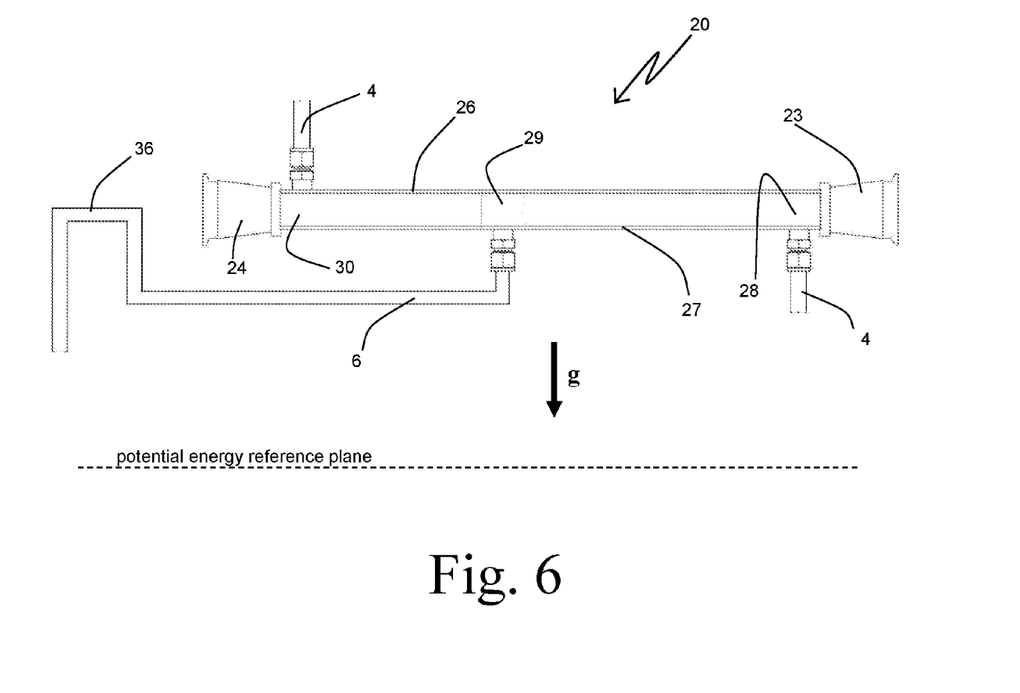
FIG. 6 is a plan view of a heat exchanger assembled into a waste heat recovery system according to an embodiment of the invention.

In the embodiment of FIG. 6 the heat exchanger 20 is arranged into the system 1 such that the force of gravity acts upon the heat exchanger 20 in the stacking direction of the fluid flow layers 21 and 22, as indicated by the arrow "g". The heat exchanger 20 is further arranged so that the bottom plate 27 is at a lower elevation relative to a potential energy reference plane than is the top plate 26. Connection of the first fluid flow path 4 to the manifold 28, as well as connection of the third fluid 6 to the manifold 29, is achieved at the bottom plate 27. Connection of the first fluid flow path 4 to the manifold 30 is achieved at the top plate 26. The third fluid flow path 6 includes a highest portion 36 that is arranged to be at an elevation between that of the top plate 26 and the bottom plate 27 relative to the potential energy reference plane.

Even when no heat is being added to the working fluid (e.g. at system startup conditions), some vapor-phase working fluid will necessarily exist in a properly charged system, such that the pressure of the vapor is equal to the saturation pressure corresponding to the working fluid temperature. When liquid working fluid is circulated through the system 1 such that all of the liquid working fluid entering the heat exchanger 20 of FIG. 6 through the manifold 28 is removed from the heat exchanger through the manifold 29, the working fluid flow channels 22 will fill with liquid working fluid to a height approximately equal to the height of the portion 36. If the heat exchanger 20 is located towards the top of the system 1, then working fluid vapor will fill the remaining layers of working fluid flow channels 22. This may be preferable to having all of the working fluid flow channels 22 filled with liquid working fluid, as such a condition could lead to undesirable pressure spikes occurring when hot gas is introduced to the heat exchanger 20 and vaporization of the liquid working fluid occurs.

During operation of a heat exchanger 20 within a waste heat recovery system 1, a first quantity of heat (Q1) is transferred from the hot gas 32 to the working fluid 34 in the first heat exchange section 9, thereby converting the working fluid 34 to a superheated vapor. The partially cooled hot gas 32 continues on to the second heat exchange section 10, where it preheats the liquid working fluid 33 and is itself further cooled by transferring a second quantity of heat (Q2) to the liquid working fluid 33. By adjusting the flow rate of the working fluid 33, the temperature of the hot gas 32 exiting the heat exchanger 20 may be controlled.

To that end, a temperature sensor 17 may be located along the hot gas stream flow path 7. The temperature sensor 17 may be located downstream of both the first and second heat exchanger sections 9, 10, as shown in FIG. 1, or it may be located elsewhere along the flow path 7. A control unit 18 may be wired to both the temperature sensor 17 and the pump 2 and may be used to control the pump 2 in order to adjust the flow rate of working fluid 33 in response to the temperature measured by the sensor 17. The control unit 18 can comprise one or more electrical and/or mechanical components to convert an electrical input from the temperature sensor 17 to a current, voltage or other type of control signal to be provided to the pump 2.

Alternatively or in addition, the temperature of the working fluid 34 delivered to the expander 3 may be controlled by varying the flow along the third working fluid flow path 6. A temperature sensor 15 may be included in the waste heat recovery system 1 along the first working fluid flow path 4 downstream of both the first and second heat exchange sections 9, 10 in order to measure the temperature of working fluid prior to the expander 3. A control unit 16 may be wired to both the temperature sensor 15 and the flow control device 11 and may be used to adjust the split between the working fluid 34 delivered to the expander and the working fluid 35 along the third working fluid flow path 6 in response to the temperature measured by the sensor 15. In some embodiments the control unit 16 can comprise one or more electrical and/or mechanical components to convert an electrical input from the temperature sensor 15 to a current, voltage or other type of control signal to be provided to an electrically actuated flow control device 11. In other embodiments the control unit 16 and flow control device 11 together can comprise a thermostatic expansion valve, with the temperature sensor 15 comprising a remote sensing bulb for the valve.

In some methods of operating a waste heat recovery system 1, a flow of liquid working fluid is pressurized and directed along the first working fluid flow path 4 by the pump 2. The working fluid is directed through the second heat exchange section 10 before being split into two portions. A first one of those portions of the working fluid is directed to the first heat exchange section 9 to be vaporized and superheated, and is subsequently non-adiabatically expanded in the expander 3 to a low pressure vapor. A second done of those portions bypasses both the first heat exchange section 9 and the expander 3 and is remixed with the first portion. The temperature of the superheated working fluid between the first heat exchange section 9 and the expander 3 is measured, and splitting the flow of liquid working fluid into a first portion and a second portion can include controlling the ratio of the second portion to the first portion in response to the measured temperature of superheated working fluid.

In some preferred embodiments the hot gas stream source 8 is an internal combustion engine, such as a compression ignition or spark ignition engine. In some such embodiments the hot gas stream flow path 7 may be part of an exhaust gas recirculation system for the internal combustion engine. In such an embodiment the hot gas flowing along the hot gas stream flow path 7 may be directed to an intake manifold of the internal combustion engine after having transferred heat to the working fluid in the first and second heat exchange sections 9, 10.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A method of recovering waste heat, the method comprising:
    pressurizing a flow of liquid working fluid from a first pressure to a second pressure higher than the first pressure;
    transferring a first quantity of heat from a hot gas stream into the flow of liquid working fluid after having pressurized the flow of liquid working fluid to the second pressure;
    splitting the flow of liquid working fluid into a first portion and a second portion after having transferred the first quantity of heat into the flow of liquid working fluid;
    transferring a second quantity of heat from the hot gas stream into the first portion but not into the second portion, wherein transferring the second quantity of heat converts the first portion to a superheated vapor;
    non-adiabatically expanding the superheated first portion;
    recombining the second portion with the expanded first portion after having non-adiabatically expanded the superheated first portion; and
    adiabatically expanding the second portion prior to recombining the first portion and the second portion, wherein the second portion adiabatically expanding is regulated via a flow control device.

2. The method of claim 1, wherein the flow control device is a fixed orifice.

3. The method of claim 1, wherein the flow control device is a variable device, the method further comprising adjusting the flow control device in order to adjust a ratio of the second portion to the first portion.

4. The method of claim 1, further comprising:
    measuring the temperature of the hot gas stream via at least one temperature sensor; and
    adjusting a flow rate of the flow of liquid working fluid in response to the measured hot gas stream temperature via operating a pump.

5. The method of claim 4, wherein the temperature of the hot gas stream is measured after the first and second quantities of heat have been transferred therefrom.

6. The method of claim 1, further comprising:
    measuring the temperature of superheated working fluid prior to non-adiabatically expanding said superheated working fluid via at least one temperature sensor.

7. The method of claim 6, wherein splitting the flow of liquid working fluid into a first portion and a second portion includes controlling a ratio of the second portion to the first portion in response to the measured temperature of superheated working fluid.

8. The method of claim 1, further comprising removing heat from the recombined first and second portions in order to produce a liquid flow of the working fluid.

9. A method of operating a Rankine cycle, comprising:
    operating a pump to circulate a flow of working fluid through a fluid circuit of the system, wherein the flow working fluid is delivered to the pump as a low-pressure liquid and exits the pump as a high-pressure liquid, the flow of working fluid comprising a first and a second portion; passing the flow of working fluid through a first heat exchange section arranged along the fluid circuit;
    passing a hot gas stream through the first heat exchange section to transfer heat from the hot gas stream to the flow of working fluid within the first heat exchange section;
    passing the first portion of the flow of working fluid through a second heat exchange section arranged along the fluid circuit after having passed the flow of working fluid through the first heat exchange section;
    passing the hot gas stream through the second heat exchange section prior to passing the hot gas stream through the first heat exchange section, to transfer heat from the hot gas stream to the first portion of the flow of working fluid within the second heat exchange section;
    non-adiabatically expanding the first portion in an expander arranged along the fluid circuit to recover work therefrom; and
    passing the second portion along a branch of the fluid circuit in order to bypass both the second heat exchange section and the expander.

10. The method of claim 9, wherein the second portion is adiabatically expanded and is then re-mixed with the first portion.

11. The method of claim 9, further comprising:
    sensing a temperature of the hot gas stream via at least one temperature sensor; and
    adjusting the operation of the pump to increase or decrease the flow of working fluid exiting the pump in response to the measured temperature.

12. The method of claim 9, further comprising:
    sensing a temperature of the first portion of the flow of working fluid at a location along the fluid circuit between the second heat exchange section and the expander via at least one temperature sensor; and
    modulating a flow control device arranged along the branch of the fluid circuit in response to the measured temperature.

13. The method of claim 12, wherein modulating the flow control device effects a change in a ratio of the second portion of the flow of working fluid to the first portion of the flow of working fluid.

14. The method of claim 12, wherein the step of modulating the flow control device includes comparing the measured temperature to a desired superheat temperature of the working fluid, modulating the flow control device to increase the rate of flow along the branch of the fluid circuit when the measured temperature is greater than the desired superheat temperature, and modulating the flow control device to decrease the rate of flow along the branch of the fluid circuit when the measured temperature is less than the desired superheat temperature.

15. A method of cooling a recirculated exhaust gas flow for an engine, comprising:
   receiving the recirculated exhaust gas flow from the engine into a first heat exchange section;
   transferring heat within the first heat exchange section from the recirculated exhaust gas flow to a first flow of working fluid in order to convert the first flow of working fluid from a liquid state to a superheated vapor state;
   receiving the recirculated exhaust gas flow from the first heat exchange section into a second heat exchange section;
   transferring heat within the second heat exchange section from the recirculated exhaust gas flow to a second flow of working fluid, the second flow of working fluid comprising the first flow of working fluid, wherein a flow rate of the second flow of working fluid is greater than a flow rate of the first flow of working fluid;
   returning the cooled recirculated exhaust gas flow to the engine,
   measuring a temperature of the recirculated exhaust gas flow between the second heat exchange section and the engine via at least one temperature sensor; and
   modulating the flow rate of the second flow of working fluid in response to the measured temperature via operating a pump.

16. The method of claim 15, further comprising passing the recirculated exhaust gas through a plurality of continuous channels formed from convoluted fins extending through both the first and the second heat exchange sections.

* * * * *